United States Patent [19]

Bibayan

[11] Patent Number: 5,659,694

[45] Date of Patent: Aug. 19, 1997

[54] METHOD AND SYSTEM FOR DISPLAYING CONTEXT SENSITIVE CHILD WINDOWS INDEPENDENTLY OF THEIR PARENT WINDOW

[75] Inventor: Farzad Bibayan, Irvine, Calif.

[73] Assignee: Canon Kabushiki Kaisha, Tokyo, Japan

[21] Appl. No.: 268,940

[22] Filed: Jun. 30, 1994

[51] Int. Cl.⁶ .................................................. G06F 15/00
[52] U.S. Cl. ........................ 395/340; 395/326; 395/342; 395/343
[58] Field of Search .................................. 395/155–161, 395/600, 650, 725, 326, 330, 334, 339, 340, 342, 343, 346, 347, 352; 345/112, 118–120

[56] References Cited

U.S. PATENT DOCUMENTS

| | | | |
|---|---|---|---|
| 4,819,189 | 4/1989 | Kikuchi et al. | 364/521 |
| 5,041,992 | 8/1991 | Cunningham et al. | 364/518 |
| 5,062,060 | 10/1991 | Kolnick | 364/521 |
| 5,175,848 | 12/1992 | Dysart et al. | 395/600 |
| 5,179,700 | 1/1993 | Aihara et al. | 395/650 |
| 5,185,885 | 2/1993 | Dysart et al. | 395/600 |
| 5,237,653 | 8/1993 | Noguchi et al. | 395/158 |
| 5,237,654 | 8/1993 | Shackelford et al. | 395/160 |
| 5,241,656 | 8/1993 | Loucks et al. | 395/158 |
| 5,271,097 | 12/1993 | Barker et al. | 395/135 |
| 5,274,755 | 12/1993 | Priem et al. | 395/157 |
| 5,291,608 | 3/1994 | Flurry | 395/725 |
| 5,367,680 | 11/1994 | Flurry et al. | 395/650 |

OTHER PUBLICATIONS

Charles Petzold, "Programming Windows 3.1", 3rd Edition, Microsoft Press, 1992, Chapter 18, pp. 883–906.

Adobe Press Release, "Adobe Systems Licenses Adobe Acrobat Software To InContext Corporation; Editing Products For SMGL Publishers To Include Adobe Software", Dec. 28, 1993.

United Electronic Industries Press Release, "1 MHz 12-bit A/D Board Under $1000 For Windows 3.1 and NT", Jun. 1993.

Popkin Software & Systems Press Release, "Popkin Ships System Architect 2.3 Featuring Multi-Document Interface", Oct. 15, 1991.

U-Lead Systems, Inc. Press Release, "U-Lead Systems Announces Innovative Full-Color Image Processing System For Windows 3.0", Feb. 18, 1991.

Intelligent Enviroments Press Release, "Applications Manager Launched Ahead of Schedule to Support OS/21.2", Mar. 15, 1990.

(List continued on next page.)

Primary Examiner—Kee M. Tung
Assistant Examiner—U. Chauhan
Attorney, Agent, or Firm—Fitzpatrick, Cella, Harper & Scinto

[57] ABSTRACT

A method of and system for generating a user-display interface which displays and manages multiple child windows anywhere on a display screen. An application is executed to create a server and to create a context manager, the context manager for monitoring current context. The application also creates and initializes a frame window, the frame window including at least an application menu and being commanded by the server so that a header block of the frame window may be selectively displayed by the operating system as a visible window on a display screen. The frame window is executed to create zero or more child nodes in response to requests to open child nodes from the application, each of the child nodes having a context type associated therewith and zero or more of the child nodes being context sensitive, the context type being monitored by the context manager, each of the child nodes being commanded by the frame to be selectively displayed by the operating system as a visible window on the display screen. Items of the application menu may be altered as a function of the context type currently being monitored by the context manager.

54 Claims, 9 Drawing Sheets

OTHER PUBLICATIONS

GST Software Press Release, "GST Software: GST Launches Designworks 2 For Windows; OLE 2 Support Included", Nov. 8, 1993.

Adobe Press Release, "Adobe Incontext: Adobe Systems Licenses Adobe Acrobat Software to InContext Corp.", Oct. 20, 1993.

Adobe Press Release, "Adobe Systems Licenses Adobe Acrobat Software to InContext Corporation; Editing Products For SMGL Publishers to Include Adobe Software", Oct. 20, 1993.

Charles Petzold, "Programming Windows", Microsoft Press, Redmond, WA, 1988, pp. 18–22, 44, 52.

D. Blain, et al., "Real–World Programming for OS/2 2.1", 1993 Sams, pp. 87, 119–120 and 225–227.

T. Burge, et al., "Advanced OS/2 Presentation Manager Programming", 1993 John Wiley & Sons, pp. 165,169.

"Multiple Modal Dialog Support For Single Threaded Applications", IBM Technical Disclosure Bulletin, vol. 37, No. 3, Mar. 1994.

"Systems Application Architecture—Common User Access Advanced Interface Design Guide", IBM, Jun. 1989, pp. 49–50, 67–71 and 115–124.

Screen Dumps From Microsoft® Windows®, Microsoft Corporation, 1985–1992, pp. 1–16.

METHOD AND SYSTEM FOR DISPLAYING CONTEXT SENSITIVE CHILD WINDOWS INDEPENDENTLY OF THEIR PARENT WINDOW

BACKGROUND OF THE INVENTION

This application is being filed with an appendix entitled, "Pseudo MDI Architecture and Programmer's Guide, Version 1".

1. Field of the Invention

The present invention concerns a method of and system for generating a user-display interface in a windows operating system. More particularly, the invention concerns a method of and system for generating a user-display interface which displays and closes child windows at positions on a display screen that are independent of the positions of the parent window.

2. Description of the Related Art

Microsoft Windows (hereafter "Windows") is software package commercially available from Microsoft Corporation, which acts as an interface between DOS and the computer user. The use of Windows is described, for example, in Person, et al., *Windows 3.1QuickStart*, 1992. The window structure and user interface provided by Windows is controlled by a Microsoft specification, Multiple Document Interface (hereafter "MDI"), which is described, for example, in Petzold, *Programming Windows* 3.1, Chapter 18. The contents of each of these publications are expressly incorporated herein by reference.

The MDI protocol dictates where and when various windows may be displayed on a computer display screen. Generally speaking, windows are of two varieties: a parent window and a child window. Typically, a parent window is opened when a user initiates execution of an application program. As execution of the application program continues, the parent window opens various child windows which allow the user to access various functionality in the application program. For example, a parent window may be opened when a user initiates execution of a word processing program. The parent window will, in turn, open a child window corresponding to each document that the user is editing or creating.

The MDI protocol dictates where on the display screen a child window can appear with respect to the position of the parent window, and dictates the change in appearance of the parent and child windows in response to various windows activities such as closing or iconizing.

The MDI protocol, however, suffers from a disadvantage in that child windows are always constrained to lie within a frame defined by the parent window. As more and more child windows are opened, this constraint results in needless clutter on the display screen, making it difficult for a user to find a desired child window and to navigate through all of the windows.

FIGS. 1A and 1B illustrate this situation with respect to an application program (hereinafter "Message Manager application program") which allows a user to send and receive multimedia messages, to manage an address book of addresses for multimedia messages, to create and edit and retrieve multimedia messages, and to dial out automatically for sending messages. Operation of a suitable Message Manager is described in detail in application Ser. No. 07/808,757, filed Dec. 17, 1991, the contents of which are incorporated herein by reference. FIGS. 1A and 1B illustrate how the MDI protocol affects the appearance of various windows that are displayed on screen 61 of a computer display terminal 62.

As shown in these figures, parent window 50 is opened when the user initiates execution of the Message Manager application program. Window 50 is provided with a header block 51, which includes a document control icon 52, a menu bar 54 and a minimize button 56. Selecting "minimize" button 56, or selecting "minimize" from a pull-down menu, reduces window 50 to an icon, that is a small graphical representation of window 50 which is displayed on screen 61. This process may be referred to as "iconizing". As will be understood by those of ordinary skill, document control icon 52 may be used to change the size or position of window 50 within display screen 61, for example, by selecting from the "move", "size", "minimize" and "maximize" menu items that are available from the pull-down menu that is displayed after document control icon 52 is selected. In addition, "Minimize" button 56 may be selected so as to minimize the screen quickly without the need for selecting from a pull-down menu.

Menu bar 54 extends horizontally across a top portion of window 50 and displays menu items available to the user, such as "file", "edit", "create", "help" and the like. Each of the menu items displayed on menu bar 54 in turn may include secondary menu items selectable from a pull-down menu. As will be understood to those skilled in the art, pull-down menus extend vertically downward from a menu item on menu bar 54 and may include various additional menu items which further specify the commands available for selection by the user.

Using a keyboard, a mouse, or the like, a user may select various items from menu bar 54 so as to initiate execution of a desired command by the computer. For example, a user may select a menu item or other object by pressing the "enter" key on a keyboard or by "clicking" a mouse on a desired item.

A window frame 63 is associated with window 50. Window frame 63, whose size may be manipulated and adjusted by the user, sets the maximum extent of operations that are controlled by parent window 50 and the Message Manager application program. That is, anything on screen 61 outside of frame 63 is not associated with the Message Manager application program while anything within frame 63 is.

Each window 50 may itself display zero or more document icons 57 or zero or more child windows 58. Child windows may hereinafter be referred to as "document windows" even though, as illustrated in FIG. 1A, the child window 58 might not necessarily contain a document (in FIG. 1A window 58 is a "dialer"). Document icons 57 are small representations that, when selected by the user, become document windows 58. Like window 50, document windows 58 may also be provided with a document control icon and a minimize button, but typically document windows 58 are not provided with menu bars. The menu items displayed on menu bar 54 apply to document windows 58.

Document windows 58 contain the data or document on which the application programs represented by parent window 50 work. The sizes and positions of document windows 58 displayed in parent window 50 may be varied by the user, for example, by "dragging" the document window across the screen. The MDI protocol, however, constrains display of child windows 58 such that no part of window 58 may be moved beyond frame 63. Thus, as shown in FIG. 1A, although an attempt has been made to move child window 58 beyond the lower left boundary of frame 63, the MDI protocol does not permit display of any portion of document window 58 that would have extended beyond frame 63.

This constraint can result in unnecessarily cluttered displays. For example, as shown in FIG. 1B, a user has opened a second document window 58. However, because of the constraint that no portion of a document window can extend beyond frame 63, one document window partially overlaps and obscures the other document window. Thus, there is a need for a user interface for multiple child (or document) windows which does not constrain the position of the child windows to lie within a frame defined by the parent window.

One commonly accepted reason for the constraint imposed by the MDI protocol is to simplify how MDI controls the reaction of parent and child windows to various user commands to open, close and manipulate the windows. For example, when a user no longer desires to continue execution of the application program corresponding to window 50, the user may "close" that application by selecting a "close" menu item from document control icon 52. The MDI protocol governs the closing of windows, and will ensure that all open documents (or child) windows within parent window 50 are also properly closed down when parent window 50 is closed down.

Thus, there is a need to ensure that child windows positioned outside a parent window frame react properly to commands which effect the parent window or other windows.

SUMMARY OF THE INVENTION

It is an object of the present invention to address the foregoing deficiencies by providing a method of and system for generating a user-display interface which may display child windows at positions on a display screen that are independent of the position and size of the parent window.

It is a further object of the present invention to address the foregoing deficiencies by providing a method of and system for generating a user-display interface which displays child windows at positions on a display screen that are independent of the position and size of the parent window while at the same time ensuring that closing or iconizing a parent window will close child windows positioned outside thereof.

It is a still further object of the present invention to provide a method of and system for generating a user-display interface which displays windows on a display screen wherein the contents of a menu displayed on the screen may be altered in accordance with the context type of the child windows being displayed.

According to one aspect of the present invention, a method of and system for generating a user-display interface are provided in which an application is constructed. The application is executed to create a server and a context manager. The application also creates and initializes a frame window, the frame window including at least an application menu and being commanded by the application so that a header block of the frame window may be selectively displayed by the operating system as a visible window on a display screen. The frame window is executed to create zero or more child nodes in response to requests to open child nodes from the application, each of the child nodes having a context type associated therewith and zero or more of the child nodes being context sensitive, the context type being monitored by the context manager, each of the child nodes being commanded by the frame to be selectively displayed by the operating system as a visible window on the display screen. Items of the application menu may be altered as a function of the context type currently being monitored by the context manager.

These and other features and advantages according to the present invention will be more readily understood by reference to the following detailed description of the preferred embodiment thereof taken in conjunction with the attached drawings.

DETAILED DESCRIPTION OF THE PREFERRED EMBODIMENT

Figure 2:
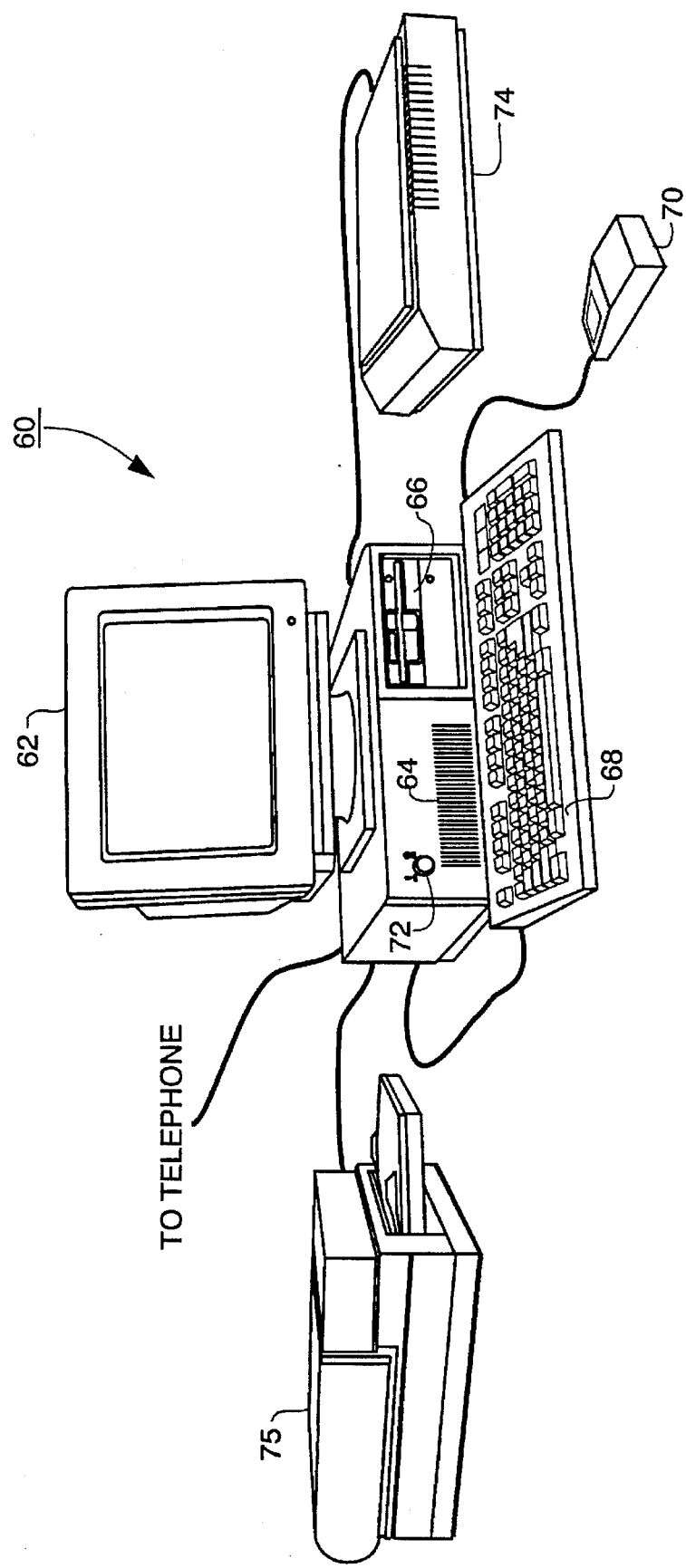
FIG. 2 is a perspective view of an apparatus according to the present invention.

FIG. 2 is a view showing the outward appearance of a representative embodiment of the present invention. Shown in FIG. 2 is computing equipment 60, such as an IBM-PC or PC-compatible computer having a user interface operating system, such as a Microsoft Windows operating system. Computing equipment 60 is provided with a display unit 62, such as a color monitor, having a display screen area 61, and also with an internal speaker 64. Computing equipment 60 also includes a mass storage device such as computer disk drive 66 for storing data files such as bitmap image files, data files, text files, sound files and the like; and for storing application program files which contain stored program instruction sequences by which computing equipment 60 manipulates data files and presents data in those files to a computer operator via display screen 61 or speaker 64.

Computer disk drive 66 further stores various applications, such as the Message Manager application program and other applications according to the present invention, a server, a frame, a context manager, a windows operating system, and the like. Computer disk drive 66 may further store data files, such as a Message Manager data base including multimedia data files, address book files, dialer files, log files, text files, etc., which have specific utility with the Message Manager application program, or with other applications configured according to the present invention.

A keyboard 68 is connected to computing equipment 60 to permit input of text data and to permit manipulation of objects displayed on display screen 61. Likewise, a pointing device 70, such as a mouse or the like, is connected to permit manipulation of objects on display screen 61. Microphone 72 permits inputting audio information.

A scanner 74 scans documents or other images and provides bitmap images of those documents to computing equipment 60. Other means for supplying bitmap image data and other data may be provided, through, for example, CD-ROMs or a modem (not shown) in computing equipment 60 via a telephone link or a network link. Likewise, a removable floppy disk drive may be provided, or digital or analog video information may be input to computing equipment 60 via an unshown video interface.

Computing equipment 60 also includes a printer 75, which operates in a conventional manner.

In accordance with operator instructions, and under the control of the operating system, stored application programs, such as the Message Manager application program, are selectively activated to process and manipulate input data.

Figure 3:
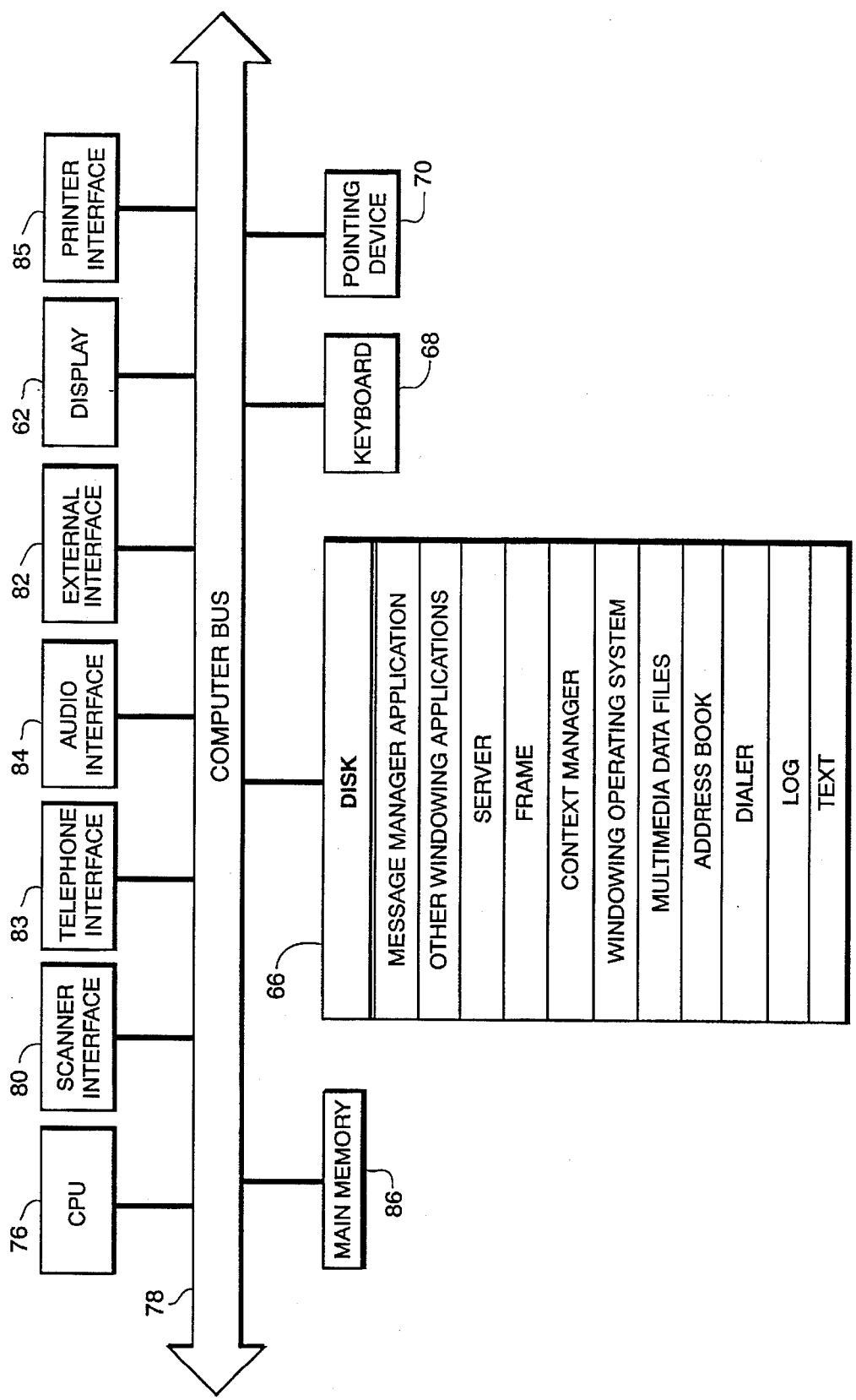
FIG. 3 is a block diagram of an apparatus according to the present invention.

FIG. 3 is a detailed block diagram showing the internal construction of computing equipment 60. As shown in FIG. 3, computing equipment 60 includes a central processing unit (CPU) 76, such as a programmable microprocessor, interfaced to a computer bus 78. Also interfaced to computer bus 78 is disk 66, keyboard 68 and mouse 70. A scanner interface 80 is provided for interface to scanner 74, an external interface 82, such as a network interface, is provided for interface to external storage media, a telephone interface 83 is provided for interfacing with a telephone (not shown), an audio interface 84 interfaces with microphone 72 and speaker 64, and a printer interface 85 is provided for interfacing with printer 75.

Main memory 86 interfaces to computer bus 78 so as to provide random access memory for use by CPU 76. In particular, when executing stored program instruction sequences such as those associated with the Message Manager application program or a word processing program, CPU 76 loads those instruction sequences from disk 66 (or other memory storage medium) into main memory 86 and executes those stored program instruction sequences out of main memory 86.

Figure 4:
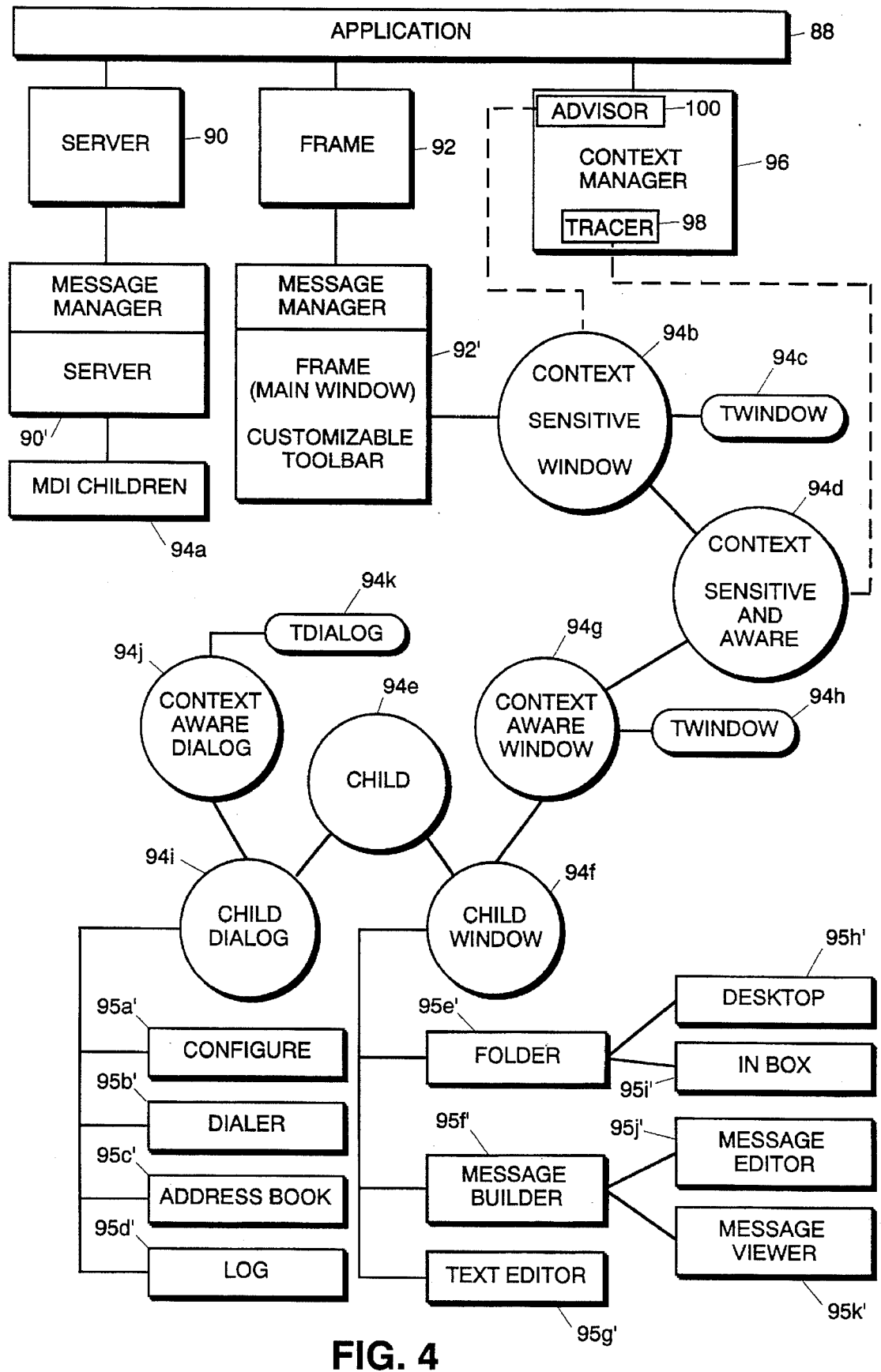
FIG. 4 is a block diagram illustrating an object-oriented implementation of features of the present invention.

FIG. 4 is a block diagram of various objects which are present, for example, on computer disk drive 66. The process steps which result in the objects illustrated in FIG. 4 are executed by CPU 76 in accordance with a computer program stored in main memory 86. FIG. 4 is intended to reflect an object-oriented implementation of the invention, in which separate and self-reliant software objects are provided for separable tasks. It is to be understood, however, that other implementations, including non-object-oriented implementations are also possible.

The objects illustrated in FIG. 4 may be executed in conjunction with other software applications, such as, for example, with Microsoft Windows, and may provide an interface between such applications and the user. The object architecture includes at least one application 88, a server 90, a frame 92, zero or more child nodes 94 and a context manager 96.

Application 88 is an object that encapsulates necessary initializations and preparations for an application. These include inheriting various core attributes from a standard or generic application, and thereafter enhancing the standard application, as desired by the user. The steps of inheriting and enhancing the functionality of an object may be referred to herein as "adapting" the object. In the context of Message Manager, for example, application 88 may contain a main application message loop (not shown) that is responsible for all dispatching of messages within application 88. The message loop also processes all special messages and dispatches messages to appropriate objects in the system.

In other contexts, application 88 encapsulates initializations and preparations tailored for the application in question. For example, for a word processing program, application 88 may set default parameters associated with a document to be edited, keyboard 68, printer 75 or the like.

Server 90 is created by application 88 and provides for mapping, dispatching, routing and translation of commands from the user for execution by CPU 76. Server 90 may also inherit attributes and may be enhanced or adapted as desired by the user. Preferably, server 90 is displayed on display screen 61 as a hidden window.

Frame 92 is also created by application 88 and is in communication with server 90. Frame 92 is a context-sensitive visible window object containing, for example, an application menu bar (shown in FIG. 6) and tool buttons, if any (also shown in FIG. 6). As used herein, an object that is "context-sensitive" modifies its behavior depending on the current context. For example, the particular menu items displayed on the application menu bar of frame 92 may vary as a function of the content of the data, documents, or the like on which application 88 is working. Frame 92 thus provides a mechanism by which menu bar selections may be displayed to the user and by which to route commands resulting from menu selections to child nodes 94a through 94k (in which 94a designates MDI children, 94b designates a context sensitive window with corresponding TWindow 94c, 94d designates a child which is both context sensitive and context aware, 94e designates a child, 94f designates a child window for child 94e with corresponding context aware window 94g and TWindow 94h, and 94i designates a child dialog for child 94e with corresponding context aware dialog 94j and TDialog 94k. Unlike application 88 and server 90, which are not ordinarily displayed to the user, frame 92 displays a visible header block to the user. That is, a visible header block is displayed by frame 92 on display screen 61, whereas application 88 and server 90 are hidden objects.

Frame 92 may also include an accelerator table (not shown). The accelerator table includes, for example, a list of combinations of keyboard characters which are assigned to a particular function. For example, pressing the "ALT" and "E" keys on keyboard 68 may result in an "edit" instruction, while pressing the "ALT" and "H" keys may result in a "help" instruction. Thus, the "ALT"-"E" and "ALT"-"H" key combinations, as well as other key combinations, may be recognized by the accelerator table as accelerators. Of course, accelerators may also include various other objects without departing from the spirit or scope of the present invention.

The use of accelerators, such as the "ALT" key, enables access from the current window to the application menu bar provided on frame 92. Thus, using accelerators permits accelerated keyboard processing by which the user may effectively select items from the application menu bar of frame 92 without exiting or changing focus of the current window.

Message management, including the execution of messages encoded as accelerators, is important to the operation of the system and method of the present invention. When messages, including accelerators and other instructions, are received by the user using keyboard 68, mouse 70 or the like, the messages are received by application 88. Application 88 first forwards the messages to server 90. If server 90 recognizes the message as being one that server 90 should execute, then server 90 executes the message. Examples of messages that may be recognized and executed by server 90 include messages to activate a frame menu bar, messages to activate a system menu, messages to close an application, messages to close a child node, messages to go to a next window, messages to go to a previous window, messages to go to a next application in the operating system, messages to activate a task manager to display a window identifying all applications on the operating system, and the like.

If server 90 does not recognize the message, then server 90 returns the message to application 88. Application 88 then sends the message to frame 92. If frame 92 recognizes the message, such as would be the case, for example, if the message were a key combination stored in the accelerator table in frame 92, then frame 92 processes the message. Otherwise, frame 92 returns the unprocessed message to application 88, which then forwards the message to child nodes 94a through 94k. If any one of child nodes 94a through 94k recognizes the message as being one that the child node should execute, then that child node executes the message. If none of the child nodes 94a through 94k does not recognize the message, the message is returned application 88, which then sends the message to other applications in the operating system.

Child nodes are objects created by frame 92 or other entities within application 88, comprising, for example, data, documents or the like on which application 88 works. For example, child nodes may be child windows, such as document windows 58 or a Borland style window object, child dialogs or a message box. (As will be appreciated by those of ordinary skill in the art, a dialog is essentially a window having a form associated with it.) It should be noted that even though child nodes are created by the user through some means in frame 92 or another application entity, the parent of all child windows is server 90.

Core functionality and default properties of child nodes may be inherited upon the creation of child nodes by frame 92 or other entities in application 88. Child nodes may then be enhanced or adapted, as desired by the user. Child nodes may be context sensitive, context aware, or both. These settings may be changed by the user, as desired. Objects that are "context aware" provide context tracer 98 (discussed below) with an identification of their context type. Like frame 92, child nodes are visibly displayed on display screen 61.

Also illustrated in FIG. 4 is a context manager 96. Context manager 96 is initialized by application 88. After being initialized, context manager 96 initializes a context tracer 98 and a context adviser 100. Context tracer 98 keeps track of the current context of the portion of the display screen on which the user is working. The current context is that of the last active one of child node 94a through 94k that is context aware. Alternatively, if there are zero child nodes, the current context may be a default context. All context aware objects pass their object types to context tracer 98 when they become active. The context type information received by context tracer 98 is passed to context adviser 100. Context adviser 100 advises all context sensitive objects when a change in context type is detected by context tracer 98.

The objects in FIG. 4 identified by non-primed numerals (e.g., 90, 92, 94, etc.) represent core architecture objects. As mentioned above, however, each of application 88, server 90, frame 92 and child nodes 94 may be enhanced to adapt specific features or attributes desired by the user° Enhanced objects are identified in FIG. 4 with a primed numeral (e.g., 90', 92', 95', etc.) For example, server 90 and frame 92 having core functionality may be enhanced or adapted, for example, to a particular application, such as Message Manager, as shown by enhanced server 90' and frame 92'. Enhanced frame 92', for example, may have a customized menu bar.

The round and oval objects illustrated in FIG. 4 collectively comprise child nodes 94a through 94k and the entities necessary to construct child nodes 94a through 94k. As mentioned above, child nodes may comprise child windows or child dialogs. Child nodes that are context aware pass their respective context types to context tracer 98, as illustrated by the dashed vertical line in FIG. 4. Child nodes 94 that are context sensitive are informed of context type changes by context adviser 100, as further illustrated by a dashed line in FIG. 4.

Child dialogs may be enhanced to adapt to a particular application. For example, child dialogs may be enhanced to become a "Config.", "Dialer" 95b', "Address Book" 95c' or "Log" 95d' dialog, as used in the Message Manager application and as illustrated in FIG. 4. Similarly, child windows may be enhanced, for example, to become "Folder" 95c' or "Message Builder" 95f' or "Text Editor" 95g' windows which are also used in the Message Manager application program and are also shown in FIG. 4. The "Folder" and "Message Builder" child windows may, in turn, be further enhanced to display "Desktop" 95h' and "In Box" 95i' windows, or "Message Editor" 95j' and "Message Viewer" 95k' windows, respectively.

The object architecture of the present invention preferably further includes a modal task processor (not shown). The modal task processor preferably may be automatically created when a modal child dialog is created and operates to require the user to respond to the child dialog before allowing the user to interact with any other component within the application. That is, no other child node 94 will be accessible by the user except for the current active child dialog. The modal task processor may also be manually started. In that case, the modal task processor must also be manually ended. All child dialogs may further create other modal child dialogs that increase the level of the modality of the application maintained by the modal processor. Upon closure of these modal child dialogs, the level of modality is decreased. The modal task processor ends when the modality level is zero.

In larger scale applications, where several applications work together to create an integrated application, there is a need for the applications to cooperate so that, even though architecturally they are separate executables, the applications are seamlessly integrated such that they appear to the user to be part of the same application. Accordingly, a cooperative application manager (not shown) may be provided to provide such cooperation. The cooperative application manager allows for separate executables to participate with the modal task processor. The result of such synchronization is that the child nodes 94 of another executable will not be accessible during modal task processing of any cooperative application.

The method and system of the present invention operate in conjunction with an established operating system, such as, for example, Windows. As is known to those of ordinary skill in the art and as discussed above, when the user of computing equipment 60 that is loaded with Windows operates equipment 60, an object, such as a parent window, may be displayed. Parent windows may further include a menu bar, program icons, or the like, from which the user may select a desired child window for display, as will be apparent to those skilled in the art. Thus, an established operating system, such as Windows, may be used in conjunction with the method and system of the present invention, for example, to display windows on a display screen.

According to the present invention, upon initiating execution of application 88, the selected application 88 is accessed from disk 66. For purposes of illustration, application 88 may, for example, be a Message Manager application program, as shown in FIG. 4. The selection of application 88 creates server 90, which commands the display of the header block for frame 92 on display screen 61. Frame 92 is configured according to which application 88 is selected by the user.

Figure 5:
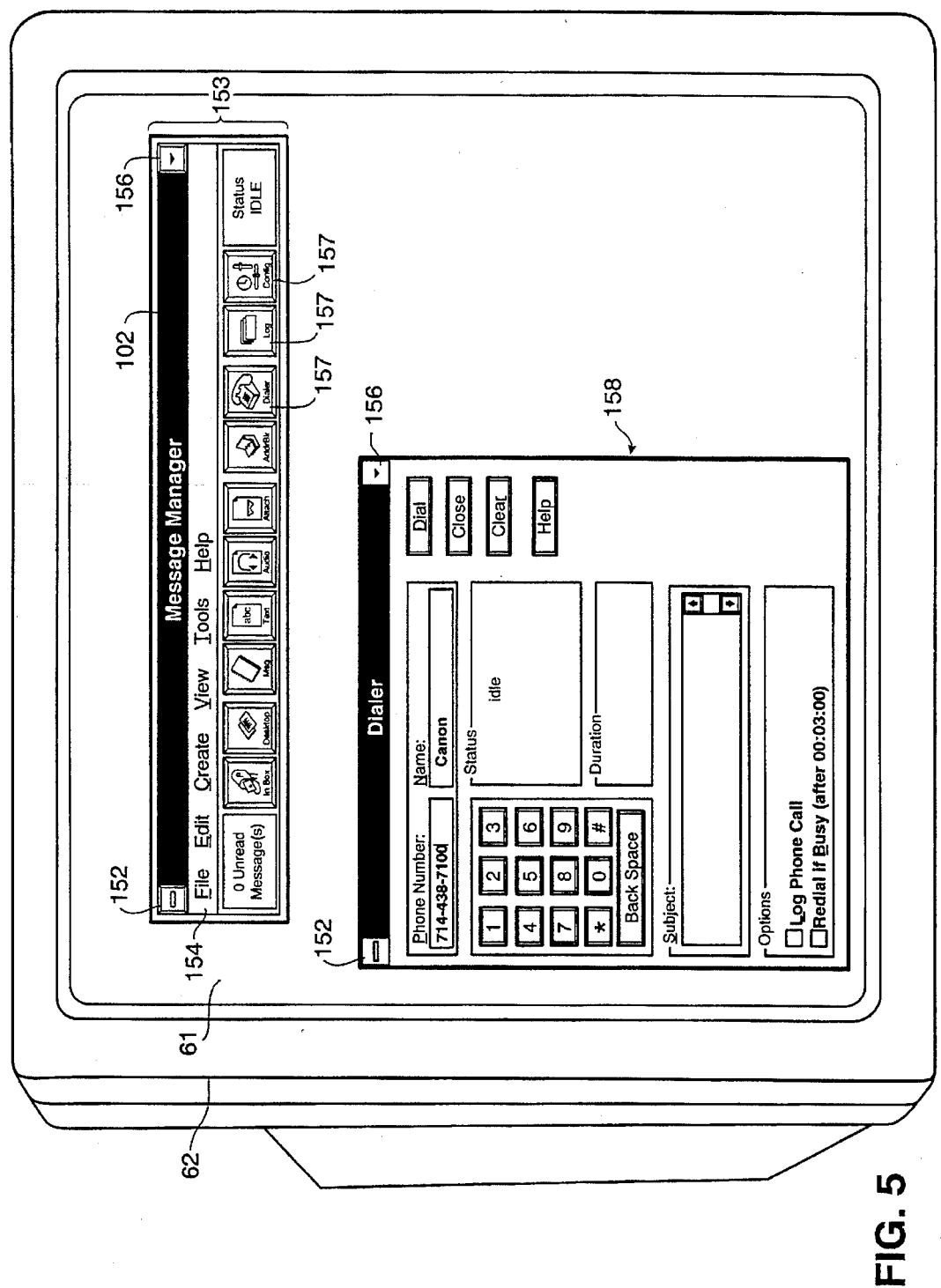
FIG. 5 is a depiction of a computer display screen representative of a display generated by the apparatus illustrated in FIG. 2.

Referring to FIG. 5, if the selected application 88 is, for example, Message Manager, the header block 153 for frame 92 may comprise a document control icon 152 or minimize button 156 or, alternatively, may have other means for being closed or iconized. Header block 153 may further include a title bar 102, a menu bar 154 and zero or more document icons 157. Instead of or in addition to document icons 157, documents available for selection by the user also may be represented by zero or more document windows 158.

Header block 153 may extend horizontally across the entire width of display screen 61 or may be sized, as desired, to occupy any contiguous subportion of display screen 61, as will be understood by those skilled in the art.

Figure 1A:
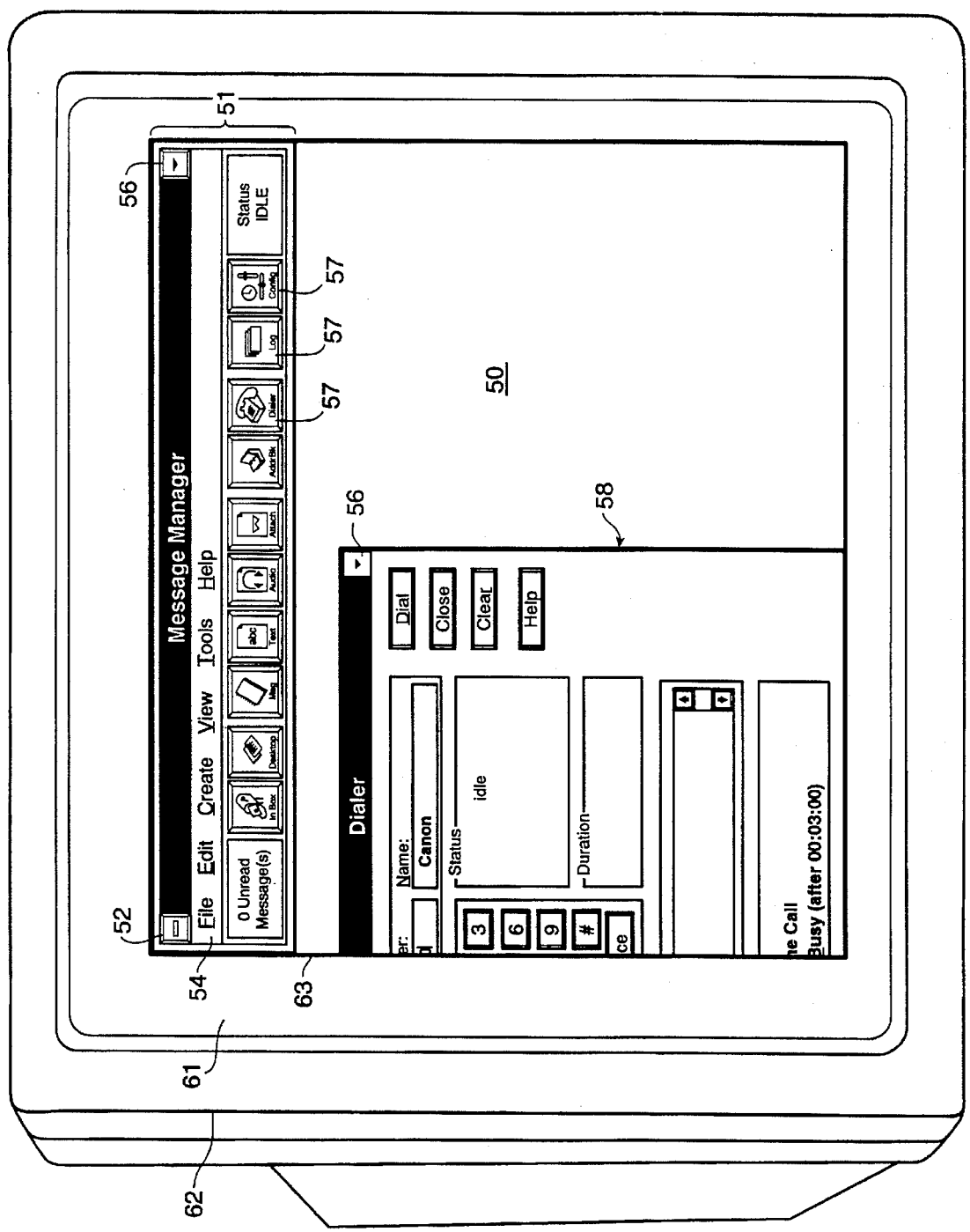
FIGS. 1A and 1B are depictions of conventional computer display screens representative of displays generated, for example, by Microsoft Windows.
Figure 1B:
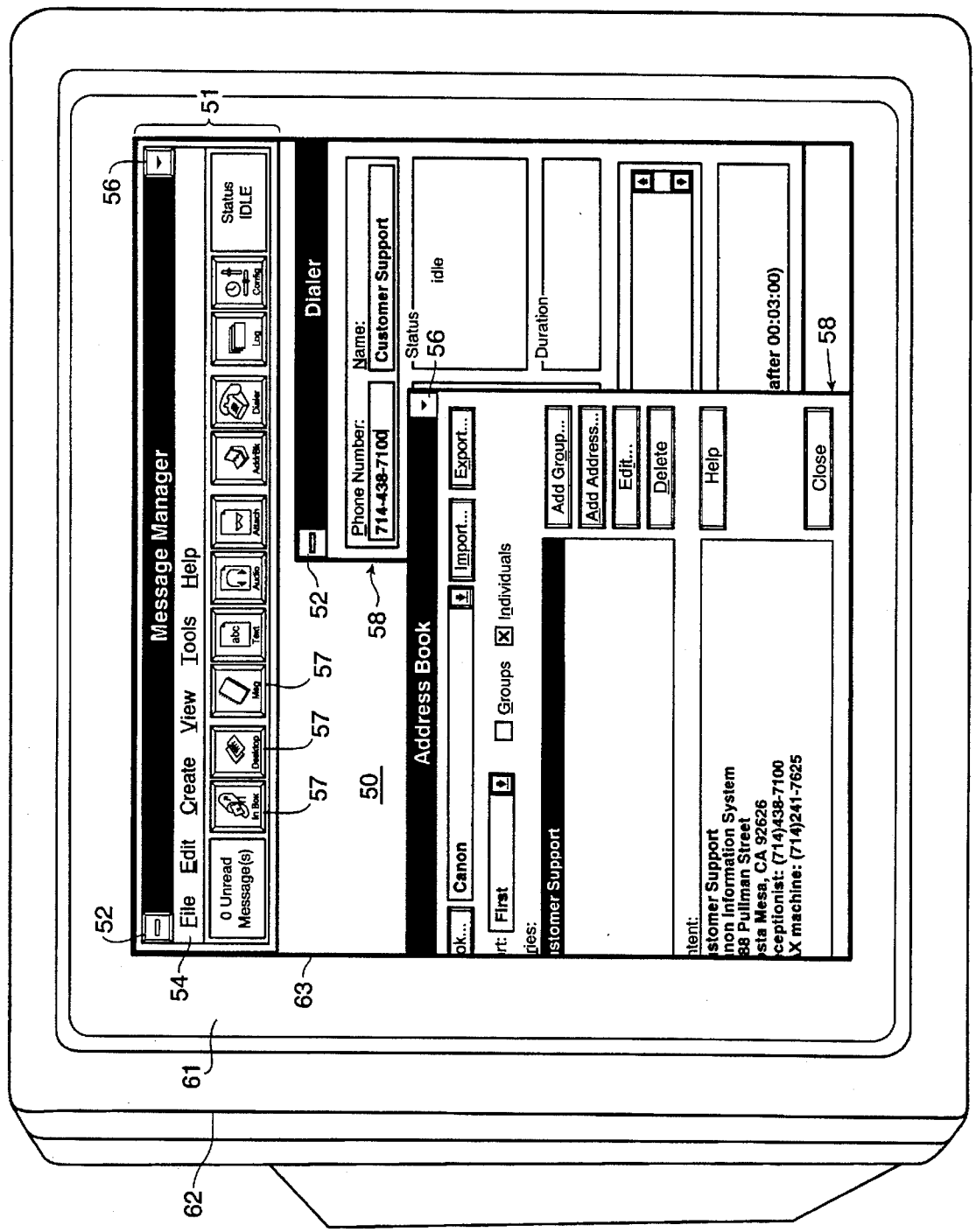

Header block 153 does not include exterior borders defining the boundaries of the window. That is, in conventional systems, such as those shown in FIGS. 1A and 1B, window 50 includes boundaries defined by frame 63. On the other hand, according to the present invention and as illustrated, for example, in FIG. 5, no side walls or boundaries extend vertically downward from header block 153. In addition, there is no bottom wall. As discussed in more detail below, because there are no side or bottom walls, document windows 158 that are opened from frame 92 or other entities in the application (i.e., child nodes 94) may be displayed anywhere on display screen 61 and are not restricted to be positioned inside the walls of a corresponding program window (i.e., the parent window).

From menu bar 154 and document icons 157 displayed on display screen 61, the user may select any of various child nodes 94 which the user desires to be displayed in connection with the given application 88. For example, referring still to FIG. 5, in which the frame 92 displays header 153 for the Message Manager application program, the user may select the Dialer document icon 157. The selection of Dialer document icon 157 by the user is effected for example, using keyboard 68 or mouse 70, signals from which are received by server 90. In response to the selection signals received from keyboard 68 or mouse 70, server 90 commands frame 92 to open the selected child node 94, e.g., document window 158. Frame 92 then commands the display of the selected document window 158 on display screen 61.

According to the present invention, child nodes 94, such as document window 158, may be displayed anywhere on display screen 61, even overlapping on the space occupied by header block 153. Because there are no side or bottom walls, document windows corresponding to the child nodes 94 can be displayed without clutter.

Figure 6:
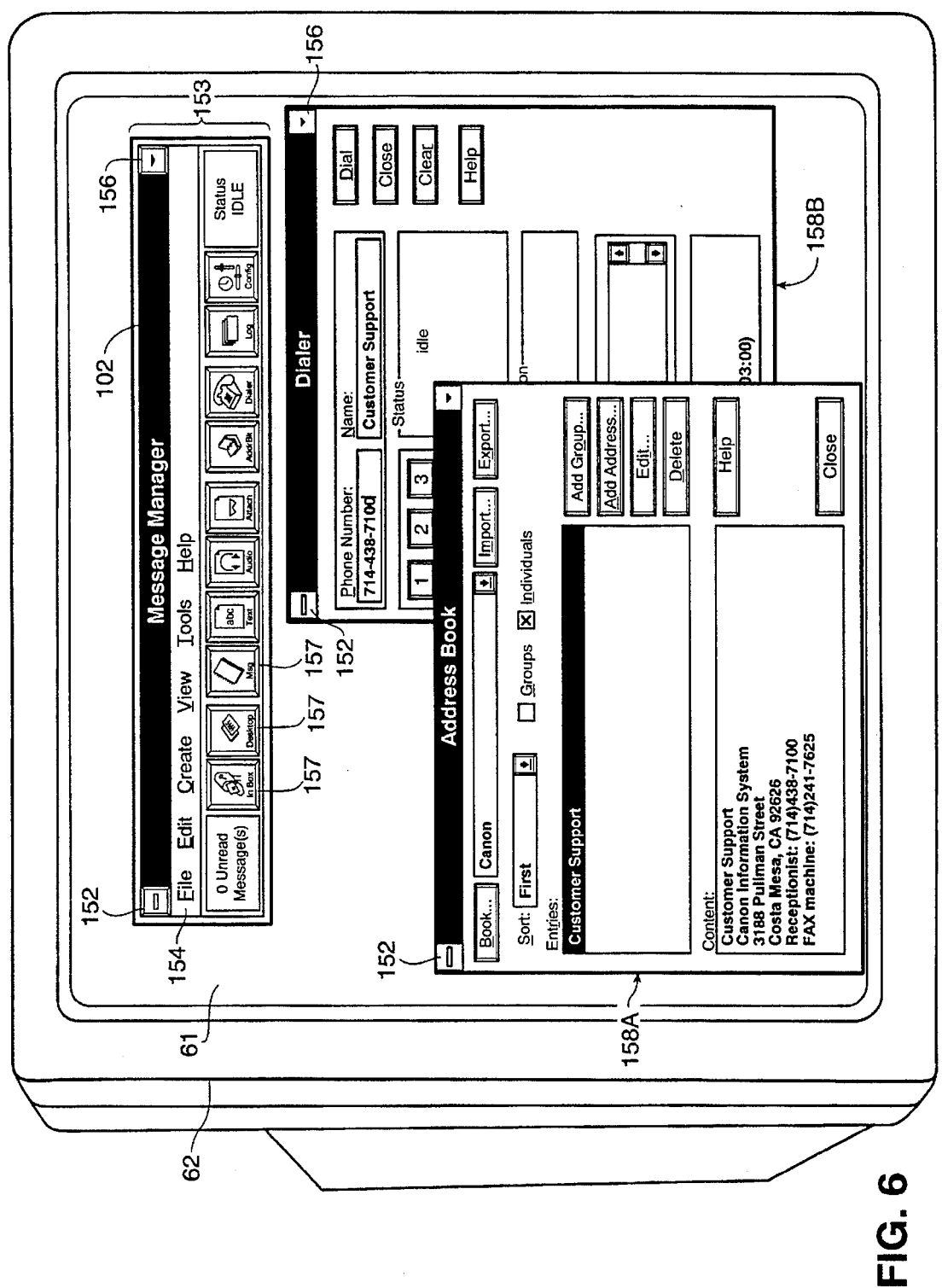
FIG. 6 is a further depiction of a computer display screen representative of a display generated by the apparatus illustrated in FIG. 2.

If desired, more than one child node 94, corresponding to document window 158, may be opened from frame 92, as illustrated, for example, in FIG. 6. In such cases, the boundaries of all document windows 158 may extend anywhere on display screen 61. As further illustrated in FIG. 6, document windows 158 each include a document control icon 152 and a minimize button 156 by which document windows may be moved and sized in a manner which will be apparent to those skilled in the art.

Even though all document windows 158 are located at arbitrary positions on display screen 61, when the user instructs frame 92 to close or iconize using, for example, document control icon 152, minimize button 156 or other suitable means, then each of document windows 158 is also closed. Specifically, the close or iconize instruction is passed from keyboard 68 or mouse 70 and is received by server 90. Pursuant to the instruction, server 90 then closes not only frame 92, but also closes each child node 94 and its corresponding document window 158 which was opened from frame 92.

As a result, unlike the operation of prior art MDI-protocol applications, according to the present invention when a parent window, such as frame 92, is closed or iconized, then all child windows, e.g., child nodes 94 corresponding to document windows 158, are also closed notwithstanding the fact that the child windows are not physically located within the boundaries of the parent window. Thus, the user may overcome the constraints present in the prior art by placing child windows anywhere on display screen 61, thereby achieving a more orderly and less cluttered display environment. Unlike prior applications in which child windows that are located outside of the parent window must each be closed individually, the user of the present invention may effectively and efficiently close all child windows, wherever located, simply by closing or iconizing the parent window.

Further in accordance with the present invention, all windows, including group windows, program windows and document windows, are associated with a particular context object which identifies the context or type of window. The context type of all context aware child nodes 94 is monitored by context tracer 98 so that context manager 96 at all times knows the context of all windows being displayed on display screen 61 or selected by the user. As a result, as different windows are selected by the user the context object changes accordingly.

As mentioned above, context adviser 100 informs context sensitive objects of context type changes. This feature is particularly useful with applications that permit the user to open different types of child windows from a single parent window. In the Message Manager application program illustrated, for example, in FIG. 6, both an Address Book child window 158A and a Dialer child window 158B are open. These windows have different functions, that is, Address Book child window 158A is used to store data, such as addresses, while Dialer child window 158B is used to interface with a telephone or the like to send and receive messages. Depending on which child window 158A or 158B is being used by the user at a particular time, different functions may be performed by the user. If Address Book child window 158A is selected, for example, the following menu items may be appropriate: edit, create, save, delete, and so on. On the other hand, if Dialer child window 158B is selected, then other menu items, such as close and clear, may be appropriate. As is known in the art, these available functions are displayed to the user in the form of a menu bar or pull-down menu.

According to the present invention, as the user activates a particular child window, such as by "clicking" on it, the context type of the active child window is monitored by context tracer 98. The context type of the active window is then passed to context adviser 100, which commands the display of selected menu items on menu bar 154 in accordance with the context type of the current context of the displayed child window. The particular items comprising the pull-down menus available from each item on menu bar 154 may also be varied as a function of the context type of the selected child window. As a result, the method and system of the present invention, including context manager 96, achieve improved menu management and permit the user to more freely select different types of child windows for display. Changing from one child window to another will thus result in the contents of menu bar 154 being updated by server 90 as a function of the context of the active window which is provided by context adviser 100.

Figure 7A:
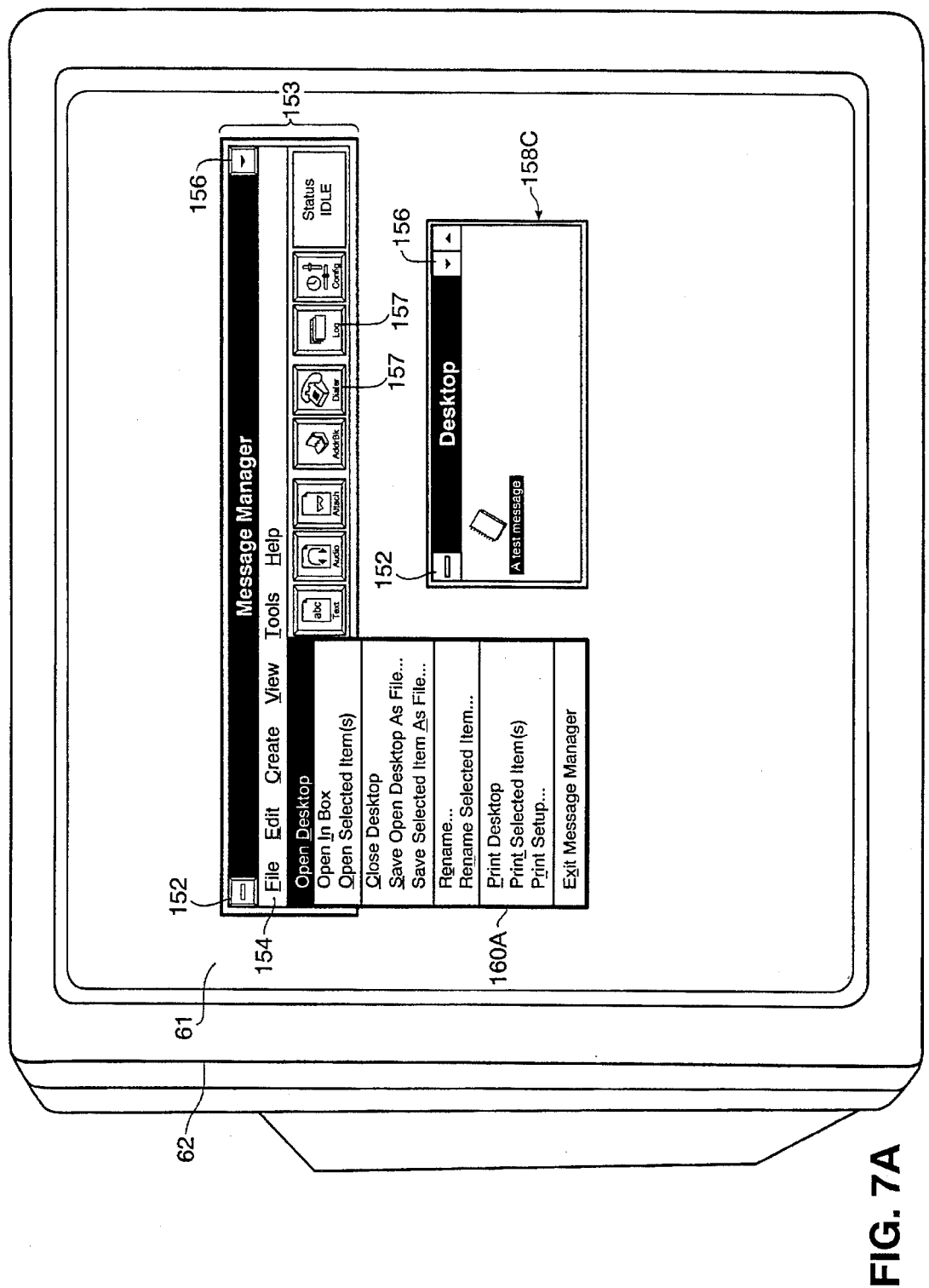
FIGS. 7A and 7B are still further depictions of computer display screens for illustrating the context management performed by the apparatus illustrated in FIG. 2.
Figure 7B:
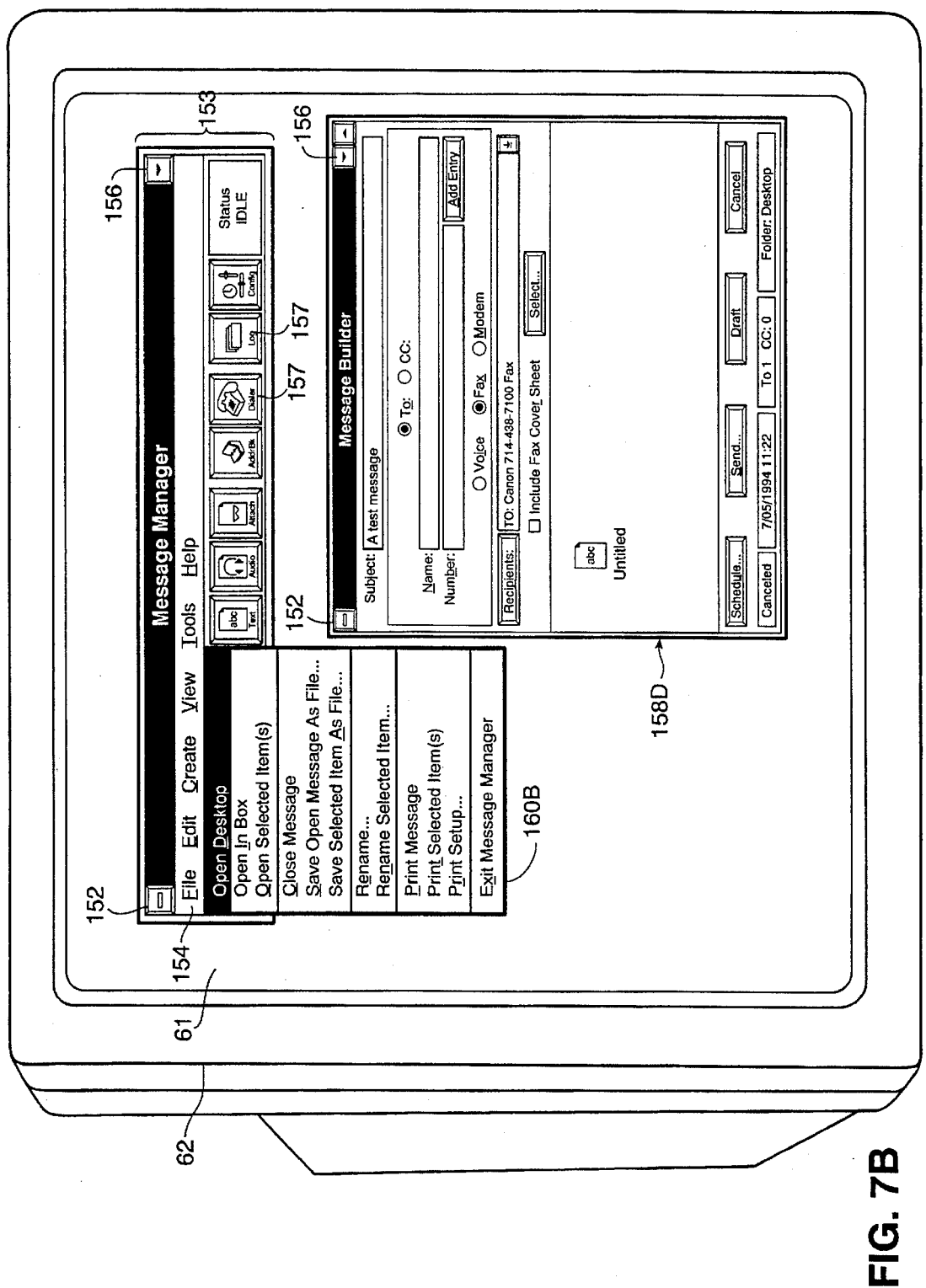

The context management achieved by context manager 96 may be further understood by reference to FIGS. 7A and 7B. As illustrated in FIG. 7A, a DeskTop child window 158C is in focus. Window 158C thus advises context tracer 98 that it is the object in context and informs context tracer 98 of its context type, that is, that it is a DeskTop child window. If the user, for example, then selects, or "clicks on", the "File" menu item on menu bar 154, a pull-down menu 160A will be displayed, extending vertically downward from the selected menu item. In accordance with the context type of the current context of DeskTop child window 158C, pull-down menu 160A will include menu items specifically directed to the window that is in context. Accordingly, pull-down menu 160A includes menu items such as "Close DeskTop", "Save Open DeskTop As File", "Print DeskTop" and the like.

If the context type of the in-context window changes, the menu-items displayed on pull-down menu 160A may also change. For example, as illustrated in FIG. 7B, if the in-focus child window becomes a Message Builder child window 158D, then window 158D will inform context tracer 98 of the change in context type, and the contents of the pull-down menu will be altered accordingly. Thus, pull-down menu 160B associated with Message Builder child window 158D may include menu items such as "Close Message", "Save Open Message As File", "Print Message" and the like, as shown in FIG. 7B.

The particular preferred protocol used in the method and system of the present invention will now be described with reference to the Programmer's Guide appended hereto. As described therein, a user-display interface according to the present invention may be developed by performing a series of steps. These steps may be broadly characterized as follows:

(1). adapting an application;
(2). adapting a server;
(3). adapting a frame; and
(4). adapting child nodes.

Optionally, a fifth step may also be performed:

(5). using a message box.

The best mode for carrying out each of these steps is set forth in detail in the appended programmer's guide and will be apparent from the disclosure set forth herein.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

- 23 -

APPENDIX

Pseudo MDI Architecture and Programmer's Guide

Version 1

Farzad Bibayan
Technology Department
9 June, 1993

- 24 -

*Pseudo MDI Architecture and Programmer's Guide*

Overview of the Architecture

This document specifies the Pseudo MDI Architecture of Message Manager.

The architecture consists of an Application Model, a Server, a Frame, and several Client (Child) Nodes.

The Application Model is an object that encapsulates all the necessary initializations and preparations for a Pseudo MDI application.

The Server provides for mapping, dispatching and routing of Pseudo MDI Commands.

Given that in a Pseudo MDI application one menu bar serves all the Pseudo MDI children, the Frame is a context sensitive window object containing the application menu bar and tool buttons. From the user's point of view, the Frame behaves as the main window of the application and changes its behavior according to the needs of the current client node.

The Client (Child) nodes are the tools, containers, or different data documents in the application. A Client (Child) node can be a regular Windows window object, a Borland style window object, or a dialog box. Special handling is also provided for message boxes.

To provide for appropriate routing of information to child nodes and allow for context sensitivity, the Context Manager has been designed. The Context Manager consists of a Context Tracer and a Context Adviser. The Context Tracer keeps track of the current context as the user moves around in the user interface amongst

- 25 -

*Pseudo MDI Architecture and Programmer's Guide* different components of the application. The Context Adviser is the entity responsible for advising interested parties whenever there is a context switch. The Context Adviser keeps track of all those components that send an Advise Request to it.

Architecturally, the Context Manager is a separate entity from the Pseudo MDI architecture. A user interface component can be a client of the Context Manager and not participate as a client to the Pseudo MDI Server. But, all Pseudo MDI Child nodes are clients of the Context Manager.

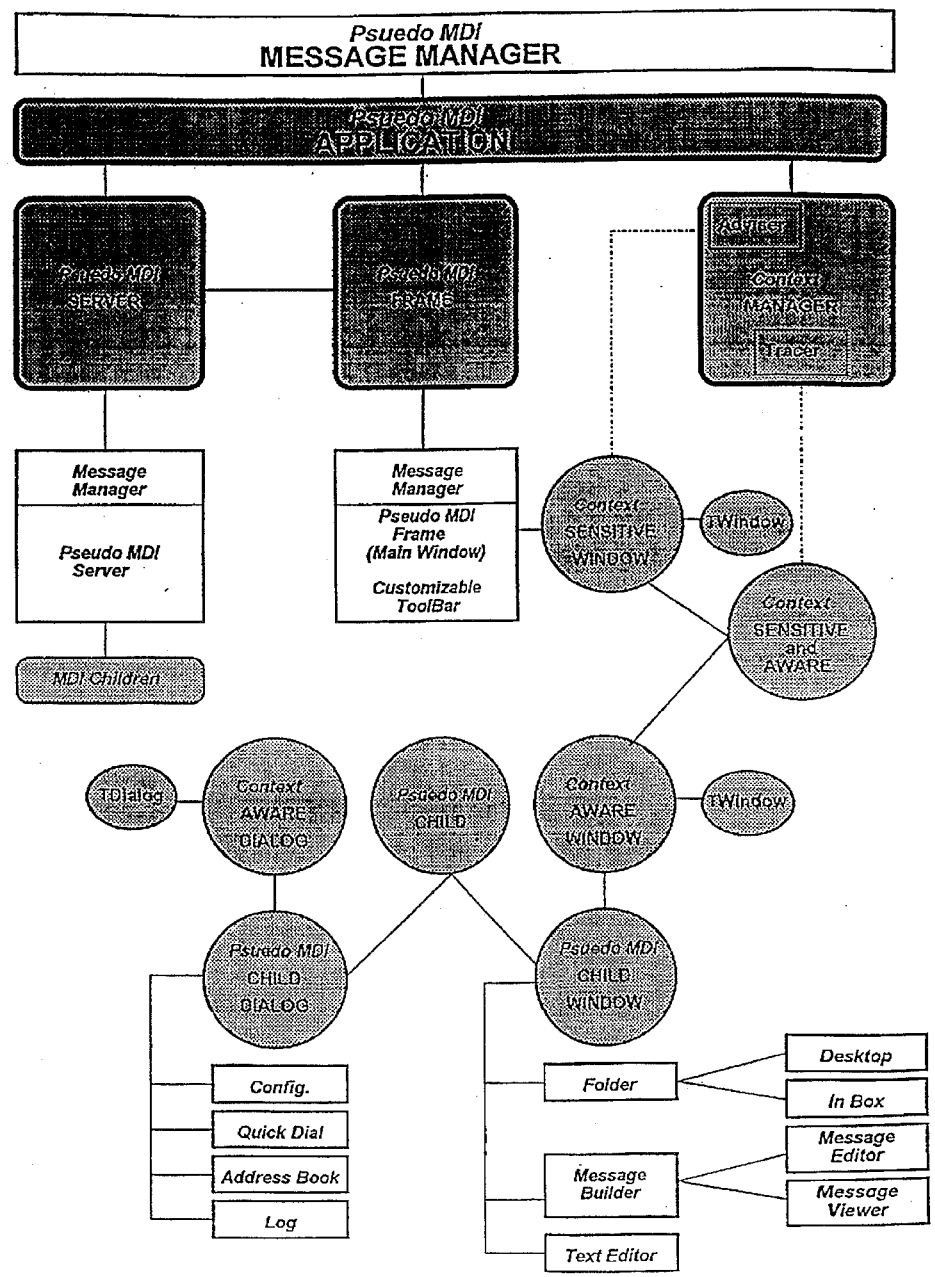

- 27 -

*Pseudo MDI Architecture and Programmer's Guide*

Context Management

Context Sensitive: An entity that modifies its behavior depending on the current context is referred to as a context sensitive entity.

Context Aware: An entity that participates with the Context Tracer and supplies the Context Manager with a Context Type is referred to as a context aware entity.

A Context Sensitive entity does not need to be Context Aware or vise versa.

void Register ContextManagerMessages()
Registers a Message with MS Windows to be used by the Context Adviser to announce context changes.

Other Windows applications may call this function to access the message used by the Context Adviser.

The Pseudo MDI Server, Frame and Child classes already provide all the necessary mechanisms to hook up to the Context Manager using this method.

Context Manager
ContextManager -- Standalone Object
ContextManager :: ContextManager()
Constructs the Context Manager, Context Adviser, and Context Tracer.

ContextManager :: ContextManager()
Destructs the Context Manager, Context Adviser, and Context Tracer.

- 28 -

*Pseudo MDI Architecture and Programmer's Guide*

BOOL ContextManager :: Register(HWND hwnd)
HWND hwnd     Handle of the window to be registered with Context Adviser Any window within the system may register itself with the Context Adviser. The Context Adviser will inform all interested entities whenever there is a context change.

All context sensitive windows use this mechanism to be informed of a context change so that they may change their internal behavior according to the new context.

BOOL ContextManager :: UnRegister(HWND hwnd)
HWND hwnd     Handle of the window to be unregistered from Context Adviser Whenever a window loses interest in being informed of context changes, it may unregister itself from the Context Adviser using this method.

void ContextManager :: SetContext(HWND AContextOwner,
                                      ContextType AContext,
                                      HACCEL AnAccel)
HWND AContextOwner     Handle of the context owner
ContextType AContext     Context type of the context owner
HACCEL AnAccel     Accelerator of the context owner Any window that is Context Aware must inform the Context Tracer of its context. A Context Aware window may also associate an accelerator with itself. The Context Tracer will also keep track of all the

- 29 -

*Pseudo MDI Architecture and Programmer's Guide* accelerators used by the context aware windows and
activates the appropriate table for each window.

void ContextManager :: SetContextOwner(HWND
AContextOwner)
HWND AContextOwner      Handle of the context owner Sets the owner of the currently active context.

HWND ContextManager :: GetContextOwner()
Gets the owner of the currently active context.

void ContextManager :: SetContextType(ContextType
AContext)
ContextType AContext    Context type of the context
                        owner Sets the type of the currently active context.

ContextType ContextManager :: GetContextType()
Gets the type of the currently active context.

void ContextManager :: SetContextAccel(HACCEL AnAccel)
HACCEL AnAccel          Accelerator of the context owner Sets the accelerator table of the currently active
context.

HACCEL ContextManager :: GetContextAccel()
Gets the accelerator table of the currently active
context.

void ContextManager :: AnnounceContext()
Used by the Context Adviser to announce the context to
all interested parties.

- 30 -

*Pseudo MDI Architecture and Programmer's Guide*

Context Aware and Sensitive Entity
ContextAS -- Pure Virtual Base Class
ContextAS :: ContextAS()
Constructs a Context Aware and/or Sensitive entity.

void ContextAS :: Setup()
Prepares and initializes the entity for being
displayed.

For Context Sensitive entities, registers itself with
the Context Adviser.  For Context Aware entities,
informs Context Manager of who it is.

void ContextAS :: Activate(RTMessage Msg)
RTMessage Msg      An incoming message from Windows For Context Aware entities, informs Context Manager of
who it is.

BOOL ContextAS :: OkToClose(void)
Conducts appropriate house cleaning before destruction
including unregistering itself from the Context
Adviser.

BOOL ContextAS :: IsContextAware()
If the entity is Context Aware, returns TRUE.
Otherwise, returns FALSE.

The default processing of this method returns TRUE.
This method can be overloaded as appropriate.

BOOL ContextAS :: IsContextSensitive()
If the entity is Context Sensitive, returns TRUE.
Otherwise, returns FALSE.

Pseudo MDI Architecture and Programmer's Guide

The default processing of this method returns FALSE.
This method can be overloaded as appropriate.

ContextType ContextAS :: GetContextType()
Returns the context type of this entity.

The default processing of this method returns
CONTEXT_DEFAULT. This method can be overloaded as
appropriate.

HACCEL ContextAS :: GetContextAccel()
Returns the accelerator table of this entity.
The default processing of this method returns NULL for
no accelerator. This method can be overloaded as
appropriate.

BOOL ContextAS :: ProcessWndMsg(RTMessage Msg)
RTMessage Msg          An incoming message from Windows Dispatches context sensitive messages.

Context Sensitive and/or Aware Window
TWindow_ContextAS:
    public TWindow,
    public ContextAs TWindow_ContextAS :: TWindow_ContextAS(PTWindowsObject
                                        AParent,
                                        LPSTR ATitle,
                                        PTModule AModule)

| | |
|---|---|
| PTWindowsObject AParent | Frame's parent window and owner |
| LPSTR ATitle | Title of the Frame window |
| PTModule AModule | Application's module object |

- 32 -

*Pseudo MDI Architecture and Programmer's Guide*

Constructs a Context Aware and Sensitive Window by constructing a TWindow and a Context Aware and/or Sensitive entity.

When inheriting from this class, remember to set the style of the window as appropriate.

void Twindow_ContextAS :: SetupWindow()
Initializes the Context Aware and Sensitive entity and the TWindow, and displays the window.

void TWindow_ContextAS :: WMActivate(RTMessage Msg)
RTMessage Msg     An incoming message from Windows Processes activation procedures for both the TWindow and the Context Aware and/or Sensitive entity.

BOOL TWindow_ContextAS :: CanClose(void)
Assures appropriate closure of both the TWindow and the Context Sensitive and/or Aware entity whenever the user requests a closure.

void TWindow_ContextAS :: DefWndProc(RTMessage Msg)
RTMessage Msg     An incoming message from Windows Dispatches context sensitivity and awareness messages.

Context Sensitive and/or Aware Window -- Borland Style
TBWindow_ContextAS:
    public TBWindow,
    public ContextAs

- 33 -

*Pseudo MDI Architecture and Programmer's Guide*

```
TBWindow_ContextAS ::
TBWindow_ContextAS(PTWindowsObject AParent,
                   LPSTR ATitle,
                   PTModule AModule)

PTWindowsObject AParent    Frame's parent window and
                               owner
    LPSTR ATitle               Title of the Frame window
    PTModule AModule           Application's module object
```

Constructs a Borland Style Context Aware and Sensitive Window by constructing a TBWindow and a Context Aware and/or Sensitive entity.

void TBWindow_ContextAS :: SetupWindow()
Initializes the Context Aware and Sensitive entity and the Borland Style TBWindow, and displays the window.

void TBWindow_ContextAS :: WMActivate(RTMessage Msg)
RTMessage Msg        An incoming message from Windows Processes activation procedures for both the TWindow and the Context Aware and/or Sensitive entity.

BOOL TBWindow_ContextAS :: CanClose(void)
Assures appropriate closure of both the Borland Style TBWindow and the Context Sensitive and/or Aware entity whenever the user requests a closure.

void TBWindow_ContextAS :: DefWndProc(RTMessage Msg)
RTMessage Msg        An incoming message from Windows Dispatches context sensitivity and awareness messages.

- 34 -

*Pseudo MDI Architecture and Programmer's Guide*

Context Sensitive and/or Aware Dialog
TDialog_ContextAS:
    public TDialog,
    public ContextAs TDialog_ContextAS :: TDialog_ContextAS(PTWindowsObject
                                AParent,
                                LPSTR ATitle,
                                PTModule AModule)

PTWindowsObject AParent    Frame's parent window and owner
LPSTR ATitle    Title of the Frame window
PTModule AModule    Application's module object Constructs a Context Aware and Sensitive Dialog by constructing a TDialog and a Context Aware and/or Sensitive entity.

TDialog_ContextAS :: TDialog_ContextAS(PTWindowsObject
                                AParent,
                                int ResourceId,
                                PTModule AModule)

Constructs a Context Aware and Sensitive Dialog by constructing a TDialog from a resource and a Context Aware and/or Sensitive entity.

void TDialog_ContextAS :: SetupWindow()
Initializes the Context Aware and Sensitive entity and the TDialog, and displays the window.

void TDialog_ContextAS :: WMActivate(RTMessage Msg)
RTMessage Msg    An incoming message from Windows

- 35 -

*Pseudo MDI Architecture and Programmer's Guide*

Processes activation procedures for both the TDialog and the Context Aware and/or Sensitive entity.

BOOL TDialog_ContextAS :: CanClose(void)
Assures appropriate closure of both the TDialog and the Context Sensitive and/or Aware entity whenever the user requests a closure.

void TDialog_ContextAS :: DefWndProc(RTMessage Msg)
RTMessage Msg        An incoming message from Windows Dispatches context sensitivity and awareness messages.

- 36 -

*Pseudo MDI Architecture and Programmer's Guide*

Pseudo MDI Application
void RegisterPseudoMDIMessages()
Registers a Message with MS Windows to be used by the Pseudo MDI engine for routing of requests.

TPseudoMDIApp:
    public TApplication

**TPseudoMDIApp :: TPseudoMDIApp(LPSTR AName,
                                  HINSTANCE hinstance,
                                  HINSTANCE hPrevinstance,
                                  LPSTR IpCmdLine,
                                  int nCmdShow)**

| | |
|---|---|
| LPSTR AName | Application's name |
| HINSTANCE hinstance | Application's instance handle |
| HINSTANCE hPrevinstance | Instance handle of the previously executing application |
| LPSTR IpCmdLine | Command line that was passed to invoke the application |
| int nCmdShow | Display Flag |

Constructs a pseudo MDI application.

TPseudoMDIApp :: TPseudoMDIApp()
Destructs a pseudo MDI application and any related resources.

void TPseudoMDIApp :: InitMainWindow()
Constructs the Pseudo MDI server and initializes the application's main window data member.

- 37 -

*Pseudo MDI Architecture and Programmer's Guide* void TPseudoMDIApp :: InitFrameWindow()
A virtual member function to construct the Pseudo MDI
Frame and initialize related data members.

void TPseudoMDIApp :: MessageLoop()
Message loop for dispatching Pseudo MDI messages.

BOOL TPseudoMDIApp :: ProcessAppMsg(LPMSG PMessage)
LPMSG PMessage          Pointer to a MSG structure from
                        Window's application queue Processes Pseudo MDI messages.

Returns TRUE if it processes the message. Otherwise,
returns FALSE.

BOOL TPseudoMDIApp :: ProcessMDIAccels(LPMSG PMessage)
LPMSG PMessage          Pointer to a MSG structure from
                        Window's application queue Overloaded for performance improvement for Borland's
OWL.

BOOL TPseudoMDIApp :: ProcessAccels(LPMSG PMessage)
LPMSG PMessage          Pointer to a MSG structure from
                        Window's application queue Dispatches for processing of Pseudo MDI Accelerators.

Returns TRUE if it processes. Otherwise, it returns
FALSE.

- 38 -

*Pseudo MDI Architecture and Programmer's Guide*

BOOL TPseudoMDIApp :: ProcessPseudoMDIAccels(LPMSG PMessage)
LPMSG PMessage    Pointer to a MSG structure from
                     Window's application queue Translates Pseudo MDI Server, Frame and Child accelerators and dispatches Pseudo MDI messages to the appropriate entity.

Returns TRUE if any translation takes place. Otherwise, returns FALSE.

Pseudo MDI Frame
TPseudoMDIFrame:
  public TWindow_ContextAS

TPseudoMDIFrame :: TPseudoMDIFrame(PTWindowsObject
                            AParent,
                            LPSTR ATitle,
                            PTModule AModule)

PTWindowsObject AParent    Frame's parent window and owner
LPSTR ATitle                Title of the Frame window
PTModule AModule          Application's module object Constructs a Pseudo MDI Frame.

void TPseudoMDIFrame :: SetupWindow(void)
Initializes Pseudo MDI Frame properties and displays the Frame Window.

BOOL TPseudoMDIFrame :: TranslateAccels(LPMSG PMessage)
LPMSG PMessage    Pointer to a MSG structure from
                     Window's application queue

- 39 -

*Pseudo MDI Architecture and Programmer's Guide*

Encapsulates accelerator translation for the Pseudo MDI
Frame.  Used by the Pseudo MDI Application.

BOOL TPseudoMDIFrame :: IsContextAware()
Pseudo MDI Frame is not Context Aware.  (Might in the
future).

BOOL TPseudoMDIFrame :: IsContextSensitive()
Pseudo MDI Frame is context sensitive.

**void TPseudoMDIFrame :: FrameSysCommand(WORD wParam,
                                          LONG lParam)**

```
WORD wParam         Command Value
LOWORD(lParam)      Horizontal position of cursor
HIWORD(lParam)      Vertical position of cursor.
```

Dispatches system commands related to the Pseudo MDI
Frame.

**void TPseudoMDIFrame :: FrameMenuCommand(WORD wParam,
                                           LONG lParam)**
```
WORD wParam         Command Value
LOWORD(lParam)      Horizontal position of cursor
HIWORD(lParam)      Vertical position of cursor.
```

Dispatches menu commands to the Pseudo MDI Frame.

**void TPseudoMDIFrame :: ChildMenuCommand(WORD wParam,
                                           LONG lParam)**
```
WORD wParam         Command Value
LOWORD(lParam)      Horizontal position of cursor
HIWORD(lParam)      Vertical position of cursor.
```

Dispatches menu commands to the Pseudo MDI Children.

- 40 -

*Pseudo MDI Architecture and Programmer's Guide*

**PTWindowsObject TPseudoMDIFrame ::
GetOwnerOfMDIChildWindows()**
Returns owner of all Pseudo MDI Children in this Pseudo
MDI Application.

HWND TPseudoMDIFrame :: GetActiveHwnd()
Gets window handle for the currently active window.
This window might or might not be a Pseudo MDI window.

Returns a window handle on success. Otherwise, returns
NULL for no active window.

HWND TPseudoMDIFrame :: GetActiveChildHwnd()
Gets window handle for the currently active Pseudo MDI
Child window. This window might be any of the possible
Pseudo MDI child window types.

Returns a window handle on success. Otherwise, returns
NULL for no active window.

ContextType TPseudoMDIFrame :: GetContextType()
Returns Context Type of the current context.

void TPseudoMDIFrame :: WMClose(RTMessage Msg)
RTMessage Msg    An incoming message from Windows Closing the Pseudo MDI Frame closes the Pseudo MDI
Application.

void TPseudoMDIFrame :: WMSysCommand(RTMessage Msg)
RTMessage Msg    An incoming message from Windows Processes system commands for the Pseudo MDI Frame.
Some of the system commands are translated into Pseudo
MDI Application commands and are dispatched.

- 41 -

*Pseudo MDI Architecture and Programmer's Guide*

Pseudo MDI Child Entity
TPseudoMDIChild -- Pure Virtual Base Class

TPseudoMDIChild :: TPseudoMDIChild(PTWindowsObject
                                   AWindowObject)

PTWindowsObject AWindowObject  Window object of the
                                child entity Constructs a Pseudo MDI Child entity void TPseudoMDIChild :: Setup()
Sets and resets properties of the Pseudo MDI Child
including system menu properties.

BOOL TPseudoMDIChild :: ProcessSysCommand(RTMessage Msg)
RTMessage Msg        An incoming message from Windows Processes special system commands related to a Pseudo
MDI Child including capture and rerouting of the ALT
key to the Pseudo MDI Frame.

Pseudo MDI Child Window
TPseudoMDIChildWindow:
        public TWindow_ContextAS,
        public TPseudoMDIChild TPseudoMDIChildWindow ::
TPseudoMDIChildWindow(PTWindowsObject AParent,
                      LPSTR ATitle,
                      PTModule AModule)

PTWindowsObject AParent    Frame's parent window and
                            owner

*Pseudo MDI Architecture and Programmer's Guide*

```
        LPSTR ATitle            Title of the Frame window
        PTModule AModule        Application's module object Constructs a Pseudo MDI Child Window with the following
 5      default properties:

WS_POPUP | WS_VISIBLE | WS_CAPTION | WS_SYSMENU |
        WS_BORDER | WS_MINIMIZEBOX | WS_MAXIMIZEBOX |
        WS_THICKFRAME
10
        Child windows inheriting from this class may reset the
        properties as necessary.  Nevertheless, the style of
        the window must always be a WS_POPUP.

15      void TPseudoMDIChildWindow :: SetupWindow()
        Initializes the Context Aware and Sensitive Window and
        the Pseudo MDI Child entity.

void TPseudoMDIChildWindow :: WMSysCommand(RTMessage
20      Msg)
        RTMessage Msg       An incoming message from Windows Reroutes system command messages to the Pseudo MDI
        Child entity for possible processing.  If Pseudo MDI
25      Child entity does not process the command, it is sent
        to the default window procedure for regular processing.
```

Pseudo MDI Child Window -- Borland Style
```
        TBPseudoMDIChildWindow:
              public TBWindow_ContextAS,
30            public TPseudoMDIChild TBPseudoMDIChildWindow ::
        TBPseudoMDIChildWindow(PTWindowsObject AParent,
35                     LPSTR ATitle,
```

- 43 -

*Pseudo MDI Architecture and Programmer's Guide*

PTModule AModule)

PTWindowsObject AParent    Frame's parent window and
                                       owner
      LPSTR ATitle                 Title of the Frame window
      PTModule AModule           Application's module object Constructs a Pseudo MDI Child Window with the following
      default properties:

WS_POPUP | WS_VISIBLE | WS_CAPTION | WS_SYSMENU |
      WS_BORDER | WS_MINIMIZEBOX | WS_MAXIMIZEBOX |
      WS_THICKFRAME

Child windows inheriting from this class may reset the
      properties as necessary. Nevertheless, the style of
      the window must always be a WS_POPUP.

void TBPseudoMDIChildWindow :: SetupWindow()
      Initializes the Borland Style Context Aware and
      Sensitive Window and the Pseudo MDI Child entity.

**void TBPseudoMDIChildWindow :: WMSysCommand(RTMessage
      Msg)**
      RTMessage Msg        An incoming message from Windows Reroutes system command messages to the Pseudo MDI
      Child entity for possible processing. If Pseudo MDI
      Child entity does not process the command, it is sent
      to the Borland window procedure for regular processing.

Pseudo MDI Child Dialog
      TPseudoMDIChildDialog:
            public TDialog_ContextAS,
            public TPseudoMDIChild

- 44 -

*Pseudo MDI Architecture and Programmer's Guide*

```
TPseudoMDIChildDialog ::
TPseudoMDIChildDialog(PTWindowsObject AParent,
                LPSTR ATitle,
                PTModule AModule)
```

PTWindowsObject AParent    Frame's parent window and owner
LPSTR ATitle    Title of the Frame window
PTModule AModule    Application's module object Constructs a Pseudo MDI Child Dialog.

```
TPseudoMDIChildDialog ::
TPseudoMDIChildDialog(PTWindowsObject AParent,
                int ResourceId,
                PTModule AModule)
```

Constructs a Pseudo MDI Child Dialog with its properties specified in a resource.

void TPseudoMDIChildDialog :: SetupWindow()
Initializes the Context Aware and Sensitive Dialog and the Pseudo MDI Child entity.

void TPseudoMDIChildDialog :: WMSysCommand(RTMessage Msg)
RTMessage Msg    An incoming message from Windows Reroutes system command messages to the Pseudo MDI Child entity for possible processing. If Pseudo MDI Child entity does not process the command, it is sent to the default dialog procedure for regular processing.

- 45 -

*Pseudo MDI Architecture and Programmer's Guide*

Pseudo MDI Message Box
```
int_export PMDIMessageBox(HWND hwndParent,
                LPCSTR IpszText,
                LPCSTR IpszTitle,
                UINT Style)
```

Constructs a Pseudo MDI Message Box.

Developing a Pseudo MDI application
Here are the steps required to create a Pseudo MDI application:

1. Adapt a TPseudoMDIApp
2. Adapt a TPseudoMDIServer
3. Adapt a TPseudoMDIFrame
4. Adapt child nodes from TPseudoMDIChildWindow, TBPseudoMDIChildWindow, or TPseudoMDIChildDialog.
5. Use PseudoMDIMessageBox.

Adapting Pseudo MDI Application Class
Here are the steps required to adapt a Pseudo MDI application:

1. Create an application object by inheriting from the TPseudoMDIApp.
2. Provide a method for the pure virtual InitFrameWindow() method.
3. Instantiate the application's Frame window.
4. Initialize the PPseudoMDIFrame data member.

Adapting Pseudo MDI Server Class
For most applications, the PseudoMDIServer is sufficient for handling all the necessary dispatching, routing and translations. If needed, you can inherit from the TPseudoMDIServer for customization.

- 46 -

*Pseudo MDI Architecture and Programmer's Guide*

Adapting Pseudo MDI Frame Class
1. Create an application specific Frame object by inheriting from the TPseudoMDIFrame.
2. Initialize the application menu in the constructor of the application's Frame class.
3. Overload the GetTopLevelAccel method and pass the application's accelerator table.
4. If necessary, overload SetupWindow.
5. Overload ProcessContextChange and provide for all context sensitive processes.
6. Overload DefCommandProc and provide for the Frame's menu processing.

Adapting Pseudo MDI Window or Dialog Class
1. Inherit from TPseudoMDIChildWindow, TBPseudoMDIChildwindow or TPseudoMDIChildDialog.
2. In the constructor provide for any necessary style bits here. Use WS_POPUP.
3. In the constructor initialize the window specific accelerator handle.
4. Overload the pure virtual function GetContextType() and return the ContextType of your window.
5. Overload the WMCommand member function for possible menu command processing.

Adapting Pseudo MDI Frame for Message Manager
1. The following keyboard combinations are reserved by Message Manager's Frame Window. Any window using these keys in any kind of keyboard handling in a window or a dialog box will not receive these keys:

ALT-F
    ALT-E

- 47 -

*Pseudo MDI Architecture and Programmer's Guide*

```
        ALT-C
        ALT-V
        ALT-T
        ALT-H
```

2.  Reserved for possible future use. Even though the following key combinations are currently passed on to the child window, they might be used in future releases.

```
        ALT-W
        ALT-O
```

Adapting Pseudo MDI Window or Dialog for Message Manager

1.  The following Context Types have already been defined:

```
enum ContextType {
        CONTEXT_DEFAULT,
        CONTEXT_FOLDER,
        CONTEXT_INBOX
        CONTEXT_MESSAGE,
        CONTEXT_DAMGR,
        CONTEXT_ADDRBOOK
};
```

If you need to assign a new ContextType, let me know.

2.  The following menu commands will be passed on to your window from the Frame window. Whenever appropriate, process these commands.

```
        CM_OPEN_ITEM
        CM_SAVE_AS_FILE
```

- 48 -

*Pseudo MDI Architecture and Programmer's Guide*

```
            CM_SAVE_ITEM_AS_FILE
            CM_CLOSE
            CM_RENAME
            CM_RENAME_ITEM
5           CM_PRINT
            CM_PRINT_ITEM

CM_EDITCUT
            CM_EDITCOPY
10          CM_EDITPASTE
            CM_EDITDELETE
            CM_EDITDELETE_ITEM

CM_CREATE_FOLDER
15          CM_CREATE_MESSAGE
            CM_CREATE_TEXT
            CM_CREATE_IMAGE
            CM_CREATE_AUDIO
            CM_CREATE_ATTACHMENT
20
            CM_VIEW_ICON
            CM_VIEW_LIST
            CM_VIEW_BY_DATETIME
            CM_VIEW_BY_SUBJECT
25          CM_VIEW_BY_ADDRESSEE
            CM_VIEW_BY_TYPE
            CM_VIEW_BY_SIZE
            CM_VIEW_BY_DELIVERY_MODE
            CM_VIEW_BY_STATUS
30          CM_VIEW_ASCENDING
            CM_VIEW_DESCENDING

CM_HELP
```

- 49 -

*Pseudo MDI Architecture and Programmer's Guide*

3. Be aware of the reserved keyboard combinations for Message Manager Frame.

What is claimed is:

1. A method of generating a user-display interface in a windows operating system, said method comprising the steps of:

executing an application to create a server, said server for dispatching user commands to the operating system;

executing the application to create a context manager and to create and initialize a frame window, said context manager for monitoring current context, said frame window including at least a menu listing at least one child node managed by the application, and said frame window being commanded by the application to be selectively displayed by the operating system as a visible header block on a display screen; and executing the frame window to create at least one child node managed by the application in response to requests to open child nodes from said menu, each of said child nodes having a context type associated therewith, said context type being monitored by said context manager in accordance with which of said child nodes is active, each of said child nodes being commanded by said frame window to be selectively displayed by the operating system as a visible window on said display screen at a position independent of that of said frame window, wherein items of said menu are altered as a function of the context type currently being monitored by said context manager.

2. A method according to claim 1, wherein one of said child nodes comprises a child window.

3. A method according to claim 1, wherein one of said child nodes comprises a child dialog.

4. A method according to claim 3, further comprising the step of invoking a modal task processor, said modal task processor disabling the frame window and any child nodes until completion of a desired task.

5. A method according to claim 4, wherein the modal task processor is invoked automatically and wherein the desired task involves execution of a modal child dialog.

6. A method according to claim 4, wherein the modal task processor is invoked manually and ended manually.

7. A method according to claim 4, wherein when the modal task processor is invoked, other modal tasks may be executed and ended.

8. A method according to claim 4, further comprising the step of creating a cooperative application manager when said modal task processor is invoked to synchronize execution between cooperative applications.

9. A method according to claim 1, wherein at least one of said child nodes is context aware.

10. A method according to claim 9, wherein said step of creating said context manager comprises the steps of creating a context tracer and a context adviser, said context tracer monitoring the context type of said child nodes that are context aware and said context adviser informing each of said context sensitive child nodes of the current context type monitored by said context tracer.

11. A method according to claim 1, wherein said server is not displayed on said display screen.

12. A method according to claim 1, further comprising the step of initializing an accelerator table including accelerators recognizable by said frame window so as permit selection of a child node from said menu through use of an accelerator.

13. A method of generating a user-display interface in a windows operating system, said method comprising the steps of:

executing an application to create a server, said server for dispatching user commands to the operating system;

executing the application to create and initialize a frame window, said frame window including at least a menu listing at least one child node managed by the application, and said frame window being commanded by the application to be selectively displayed by the operating system as a visible header block on a display screen; and executing the frame window to create at least one child node managed by the application in response to requests to open child nodes from said menu, each of said child nodes being commanded by said frame window to be selectively displayed by the operating system as a visible window on said display screen at a position independent of that of said frame window, whereby said child nodes may be displayed anywhere on said display screen.

14. A method according to claim 13, wherein one of said child nodes comprises a child window.

15. A method according to claim 13, wherein one of said child nodes comprises a child dialog having a context type associated therewith.

16. A method according to claim 15, further comprising the step of invoking a modal task processor, said modal task processor disabling the frame window and any child nodes until completion of a desired task.

17. A method according to claim 16, wherein the modal task processor is invoked automatically and wherein the desired task involves execution of a modal child dialog.

18. A method according to claim 16, wherein the modal task processor is invoked manually and ended manually.

19. A method according to claim 16, wherein when the modal task processor is invoked, other modal tasks may be executed and ended.

20. A method according to claim 16, further comprising the step of creating a cooperative application manager when said modal task processor is invoked to synchronize execution between cooperative applications.

21. A method according to claim 13, wherein said server is not displayed on said display screen.

22. A method according to claim 13, further comprising the step of initializing an accelerator table including accelerators recognizable by said frame window so as to permit selection of a child node from said menu through use of an accelerator.

23. A method of developing a user-display interface in a windows operating system, said method comprising the steps of:

adapting an application;

adapting a server from said application, said server for dispatching user commands to the operating systems;

adapting a frame window, said frame window including objects for selectively displaying at least a menu listing child nodes managed by the application as a visible header block on a display screen by the operating system; and adapting one or more child nodes managed by the application in response to requests to open child nodes from said menu, each of said child nodes including objects commanded by said frame window to be selectively displayed by the operating system as a visible window on said display screen at a position independent of that of said frame window.

24. A method according to claim 23, wherein said step of adapting said server further comprises the step of adapting a context manager for monitoring current context, said context manager including objects for altering items of said menu as a function of a context type of a child node that is active.

25. A method according to claim 23, further comprising the step of initializing an accelerator table including objects for recognizing accelerators input by the user to select a child node from said menu.

26. A method according to claim 23, wherein one of said child nodes comprises a child window object.

27. A method according to claim 23, wherein one of said child nodes comprises a child dialog object having a context type associated therewith.

28. A method according to claim 27, further comprising the step of invoking a modal task processor, said modal task processor including objects for disabling the frame window and any child nodes until completion of a desired task.

29. A method according to claim 28, wherein the modal task processor is invoked automatically and wherein the desired task involves execution of a modal child dialog.

30. A method according to claim 28, wherein the modal task processor is invoked manually and ended manually.

31. A method according to claim 28, wherein when the modal task processor is invoked, other modal tasks may be executed and ended.

32. A method according to claim 28, further comprising the step of creating a cooperative application manager when said modal task processor is invoked to synchronize execution between cooperative applications.

33. A system for generating a user-display interface in a windows operating system comprising:
- a server created by execution of an application, said server for dispatching user commands to the operating system;
- a context manager created by execution of the application, said context manager for monitoring current context;
- a frame window, created and initialized by the application and including at least a menu listing child nodes managed by the application, and said frame window being commanded by the application to be selectively displayed by the operating system as a visible header block on a display screen; and
- at least one child node managed by the application and created by executing the frame window in response to requests to open child nodes from said application, each of said child nodes having a context type associated therewith, said context being monitored by said context manager in accordance with which of said child nodes is active, each of said child nodes being commanded by said frame window to be selectively displayed by the operating system as a visible window on said display screen at a position independent of that of said frame window,
- wherein items of said menu are altered as a function of the context currently being monitored by said context manager.

34. A system according to claim 33, wherein one of said child nodes comprises a child window.

35. A system according to claim 33, wherein one of said child nodes comprises a child dialog.

36. A system according to claim 35, further comprising a modal task processor, said modal task processor disabling the frame window and any child nodes until completion of a desired task.

37. A system according to claim 36, wherein the modal task processor is invoked automatically and wherein the desired task involves execution of a modal child dialog.

38. A system according to claim 36, wherein the modal task processor is invoked manually and ended manually.

39. A system according to claim 36, wherein when the modal task processor is invoked, other modal tasks may be executed and ended.

40. A system according to claim 36, further comprising a cooperative application manager, created when said modal task processor is invoked, to synchronize execution between cooperative applications.

41. A system according to claim 33, wherein at least one of said child nodes is context aware.

42. A system according to claim 33, wherein said context manager comprises a context tracer and a context adviser, said context tracer monitoring the context types of said child nodes that are context aware and said context adviser informing each of said context sensitive child nodes of the current context monitored by said context tracer.

43. A system according to claim 33, wherein said server is not displayed on said display screen.

44. A system according to claim 33, further comprising an accelerator table including accelerators recognizable by said frame window so as to permit selection of a child node from said menu through use of an accelerator.

45. A system of generating a user-display interface in a windows operating system, said system comprising:
- a server created by execution of an application, said server for dispatching user commands to the operating system;
- a frame window, created and initialized by said application and including at least a menu listing child nodes managed by the application, and said frame window being commanded by the application to be selectively displayed by the operating system as a visible header block on a display screen; and
- at least one child node managed by the application and created in response to requests to open child nodes from said application, each of said child nodes being commanded by said frame window to be selectively displayed by the operating system as a visible window on said display screen at a position independent of that of said frame window,
- whereby said child nodes may be displayed anywhere on said display screen.

46. A system according to claim 45, wherein one of said child nodes comprises a child window.

47. A system according to claim 45, wherein one of said child nodes comprises a child dialog having a context type associated therewith.

48. A system according to claim 47, further comprising the step of invoking a modal task processor, said modal task processor disabling the frame window and any child nodes until completion of a desired task.

49. A system according to claim 48, wherein the modal task processor is invoked automatically and wherein the desired task involves execution of a modal child dialog.

50. A system according to claim 48, wherein the modal task processor is invoked manually and ended manually.

51. A system according to claim 48, wherein when the modal task processor is invoked, other modal tasks may be executed and ended.

52. A system according to claim 48, further comprising the step of creating a cooperative application manager when said modal task processor is invoked to synchronize execution between cooperative applications.

53. A system according to claim 45, wherein said server is not displayed on said display screen.

54. A system according to claim 45, further comprising the step of initializing an accelerator table including accelerators recognizable by said frame window so as to permit selection of a child node from said menu through use of an accelerator.

* * * * *

UNITED STATES PATENT AND TRADEMARK OFFICE
CERTIFICATE OF CORRECTION

PATENT NO. : 5,659,694

DATED : August 19, 1997

INVENTOR : Farzad Bibayan

It is certified that error appears in the above-identified patent and that said Letters Patent is hereby corrected as shown below:

COLUMN 6

Line 23, change "94k" to --94k)--.

COLUMN 7

Line 11, change "the message is returned" to --then the message is returned to--;

Line 53, change "user°" to --user.--; and

Line 55, change "etc.)" to --etc.).--

COLUMN 8

Line 15, change "95b'" to --95h'--.

Signed and Sealed this

Third Day of February, 1998

Attest:

BRUCE LEHMAN

Attesting Officer     Commissioner of Patents and Trademarks